United States Patent
Tonry et al.

(10) Patent No.: US 9,558,329 B2
(45) Date of Patent: Jan. 31, 2017

(54) LICENSE MANAGEMENT USING A BASIC INPUT/OUTPUT SYSTEM (BIOS)

(71) Applicants: Richard M. Tonry, Austin, TX (US); Balasingh Ponraj Samuel, Round Rock, TX (US)

(72) Inventors: Richard M. Tonry, Austin, TX (US); Balasingh Ponraj Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 185 days.

(21) Appl. No.: 14/309,079

(22) Filed: Jun. 19, 2014

(65) Prior Publication Data
US 2015/0370575 A1    Dec. 24, 2015

(51) Int. Cl.
*G06F 9/44* (2006.01)
*G06F 21/10* (2013.01)

(52) U.S. Cl.
CPC ................................. *G06F 21/10* (2013.01)

(58) Field of Classification Search
CPC .............................. G06F 9/4401; G06F 9/4416
See application file for complete search history.

(56) References Cited

U.S. PATENT DOCUMENTS

| | | | | |
|---|---|---|---|---|
| 2005/0114265 A1* | 5/2005 | Satkunanathan | ....... | G06F 21/10 705/59 |
| 2006/0053080 A1* | 3/2006 | Edmonson | .............. | G06F 21/10 705/59 |
| 2007/0098149 A1* | 5/2007 | Coenen | ................. | G06F 21/123 380/2 |
| 2010/0274998 A1* | 10/2010 | Rogers | ................. | G06F 9/4418 713/2 |
| 2013/0144633 A1* | 6/2013 | Guadarrama | .......... | G06Q 30/06 705/1.1 |
| 2014/0020113 A1* | 1/2014 | Shah | ....................... | G06F 21/60 726/27 |

OTHER PUBLICATIONS iDRAC7 Licensing Dell Technical White Paper, 2012, 41 pages.

* cited by examiner

*Primary Examiner* — Thomas Lee
*Assistant Examiner* — Chad Erdman
(74) *Attorney, Agent, or Firm* — Baker Botts L.L.P.

(57) ABSTRACT

Methods and systems for license management using a basic input/output system (BIOS) may involve performing license activation, monitoring, and enforcement. The BIOS may store license information to manage licenses for hardware and/or software components of an information handling system. License management by the BIOS may include monitoring a system clock of the information handling system for changes to avoid tampering with license durations.

15 Claims, 5 Drawing Sheets

LICENSE MANAGEMENT USING A BASIC INPUT/OUTPUT SYSTEM (BIOS)

BACKGROUND

Field of the Disclosure

This disclosure relates generally to information handling systems and more particularly to license management using a basic input/output system (BIOS).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain information handling systems, a basic input/output system (BIOS) may include BIOS firmware for various hardware management tasks.

SUMMARY

In one aspect, a disclosed method includes receiving, at a basic input/output system (BIOS) included in an information handling system, a request to activate a license associated with the information handling system. The method may include retrieving, by the BIOS from a BIOS non-volatile memory, license information for the license. The license information may be usable to activate the license. Based on the license information, the method may include activating the license on the information handling system. The BIOS may store an activation timestamp for the license in the BIOS non-volatile memory.

Other disclosed aspects include article of manufacture comprising a non-transitory computer-readable medium storing instructions executable by a processor, and the information handling system comprising a processor subsystem having access to the BIOS.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, certain information handling systems may include BIOS firmware that may control certain hardware elements and may provide for user management of the hardware elements. As will be described in further detail herein, a BIOS non-volatile memory may store BIOS firmware and license information for managing licenses of components included in the information handling system. The components may be hardware and/or software components. In this manner, additional revenue sources after the sale of the information handling system may be realized by providing license management and renewal using the BIOS. Additionally, upgrade paths for hardware and software features may be managed by the BIOS, since the BIOS is capable of controlling (i.e., activating and/or deactivating) certain hardware and software features. The methods and systems described herein for license management using the BIOS may enable, for example, delivery of uniformly equipped information handling systems where certain features are individually activated (or remain deactivated) according to purchased licenses.

Particular embodiments are best understood by reference to FIGS. 1, 2, 3, 4, and 5 wherein like numbers are used to indicate like and corresponding parts.

Figure 1:
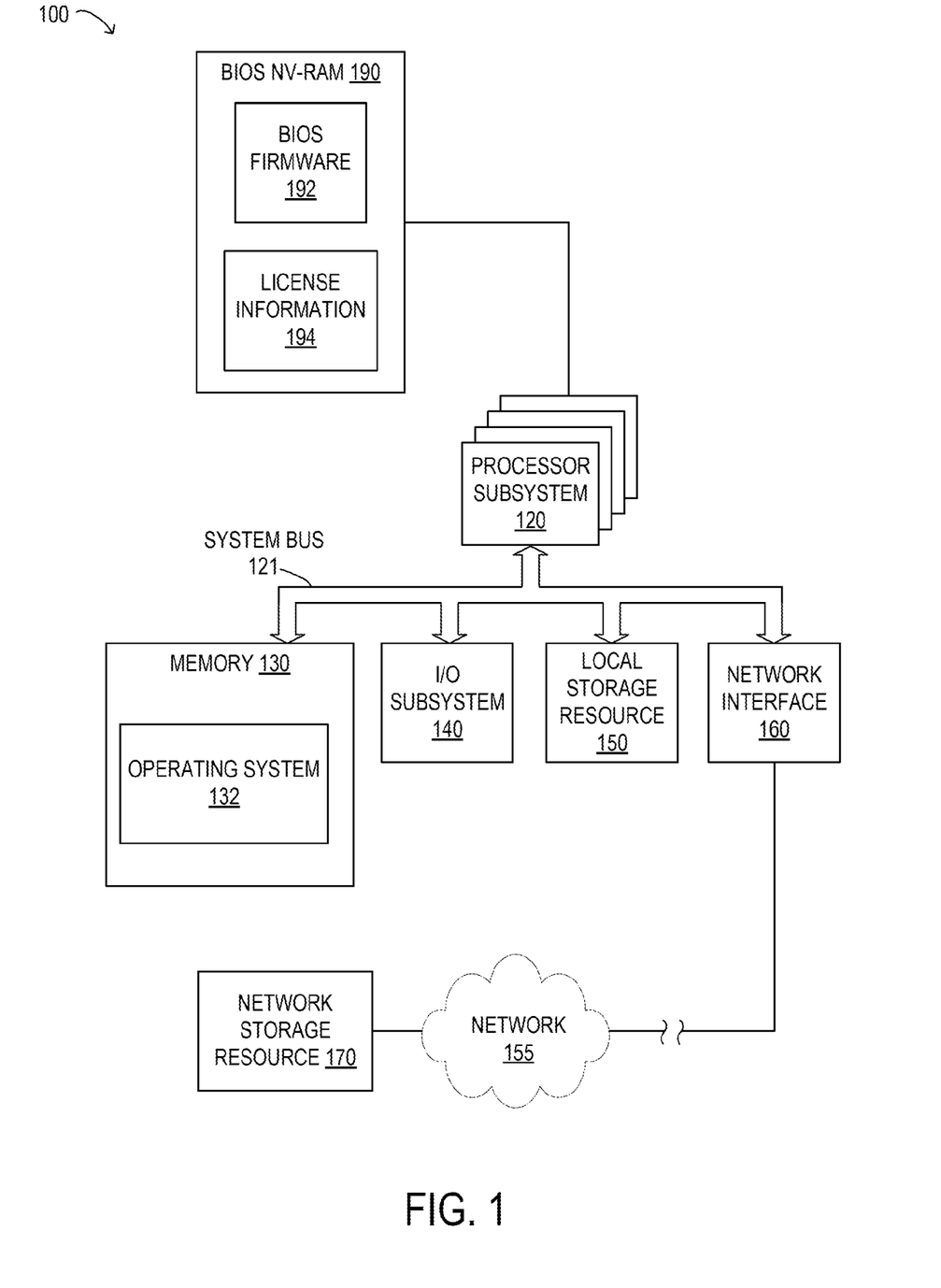
FIG. 1 is a block diagram of selected elements of an embodiment of an information handling system for license management using a BIOS.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is BIOS non-volatile random access memory (NV-RAM) 190, often simply or collectively referred to as the 'BIOS'. As shown, BIOS NV-RAM 190 may include BIOS firmware 192, representing pre-boot instructions executable by processor subsystem 120, for example, for preparing information handling system 100 to boot by activating various hardware components in preparation of launching operating system 132 for execution. In certain embodiments, BIOS NV-RAM 190 complies with a Unified Extensible Firmware Interface (UEFI) specification promulgated by the UEFI Forum (UEFI.org). Also shown stored in BIOS NV-RAM 190 is license information 194, which may be employed for license management by BIOS firmware 192 according to the methods described herein. In certain embodiments, license information 194 may be stored remotely (not shown), such as in network storage resource 170.

In operation, when information handling system 100 is powered on, BIOS firmware 192 may be launched and may execute. As referred to herein, BIOS firmware 192 may represent instructions executing on processor subsystem 120. It is noted that other processors and/or processor subsystems, such as an embedded controller (EC) or a secondary processor (not shown), may be used to execute BIOS firmware 192 in various embodiments. When BIOS firmware 192 executes, BIOS firmware 192 may be enabled to receive requests for license activation of certain components included in information handling system 100. For example, BIOS firmware 192 may display a user interface that enables a user to manage (e.g., activate, monitor, suspend, renew, purchase, deactivate, among other license management tasks) licenses for the components, which may be hardware and/or software components. In certain embodiments, BIOS firmware 192 may enable a user to purchase a license. For licenses that are valid (i.e., purchased or otherwise obtained) on information handling system 100, BIOS firmware 192, as will be described in further detail herein, may store certain data, such as timestamps, durations, expiration times, etc., in license information 194 for license management purposes that include activation, deactivation, and monitoring.

Furthermore, as described below in further detail, BIOS firmware 192 may monitor a system clock (not explicitly shown) included with information handling system 100 and may be able to detect when a time change of the system clock is initiated. In particular, BIOS firmware 192 may be interfaced with a hardware trap (e.g., an interrupt) that is executed when the time change of the system clock is initiated. Thus, BIOS firmware 192 may be operable to capture a system clock timestamp before and after the system clock change is performed, and may further be operable to adjust and/or update license information accordingly, for the purposes of license management. In this manner, BIOS firmware 192 may provide robust and tamper-resistant license management.

Figure 2:
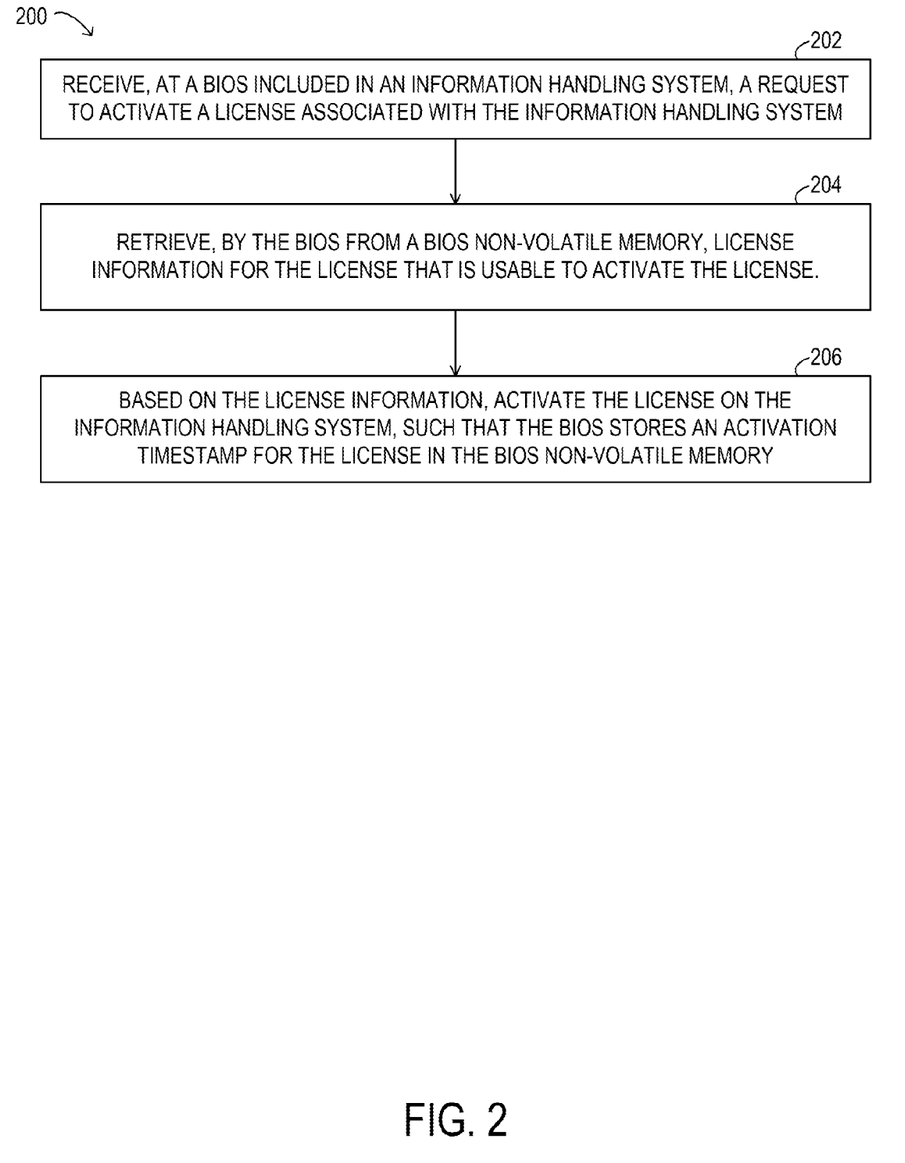
FIG. 2 is a flowchart depicting selected elements of an embodiment of a method for license management using a BIOS.

Turning now to FIG. 2, a block diagram of selected elements of an embodiment of method 200 for license management using a BIOS is depicted in flowchart form. Method 200 may be performed using information handling system 100 (see FIG. 1). It is noted that certain operations described in method 200 may be optional or may be rearranged in different embodiments.

Method 200 may begin by receiving (operation 202), at a BIOS included in an information handling system, a request to activate a license associated with the information handling system. The request may be received at a user interface implemented by the BIOS. Then, the BIOS may retrieve (operation 204), from a BIOS non-volatile memory, license information for the license that is usable to activate the license. In certain embodiments, the license information, such as license information 194 (see FIG. 1), may store structured data, such as a database, or a registry, that may be indexed for a particular license. The license information may include a license policy that includes various parameters, flags, instructions, and/or executable code for managing a particular license. Based on the license information, the license may be activated (operation 206) on the information handling system, such that the BIOS stores an activation timestamp for the license in the BIOS non-volatile memory. The activation of the license in operation 206 may be conditional (not shown in FIG. 2) upon purchase (or other means for procuring and/or obtaining) of a license contract from a vendor of the license. As will be used herein, a 'license' refers to an authorization to use a certain component in the information handling system and may be associated with a license duration (i.e., a license period) for which the authorization is valid. The activation timestamp may signify an initial time/date when a license is activated (e.g., the start of the license duration, when applicable) for use on the information handling system, which may be recorded in the license information.

Figure 3:
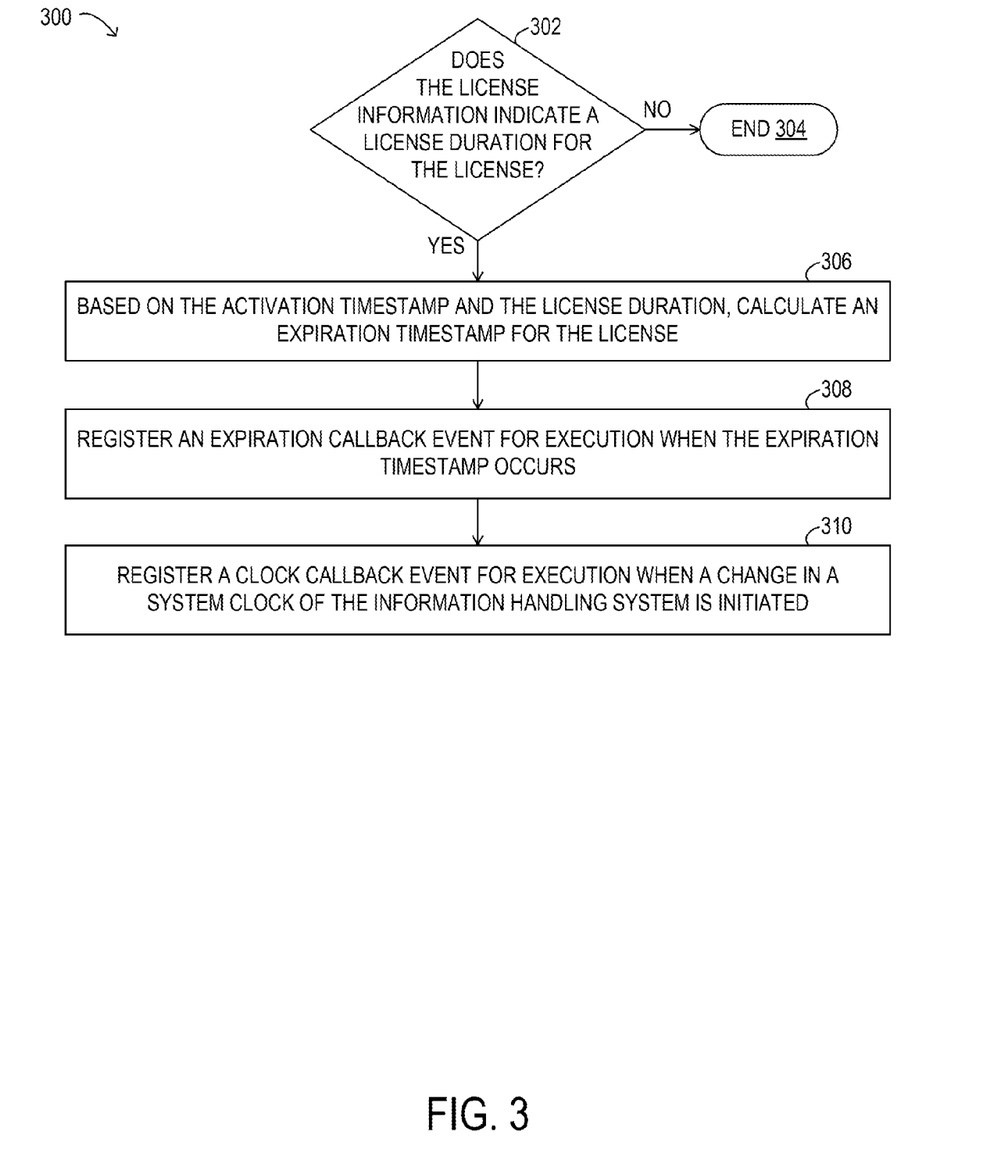
FIG. 3 is a flowchart depicting selected elements of an embodiment of a method for license management using a BIOS.

In various embodiments of method 300 shown in FIG. 3, operation 206 may include other actions by the BIOS. For example, the activation timestamp may be obtained from a local clock source (i.e., the system clock of the information handling system) and/or from a remote clock source, such as a timestamp server via a network connection, such as network interface 160. Also, the license information may be accessed to determine a licensed component of the information handling system for use according to the license. The licensed component may be a hardware component and/or a software component, which may be under the control and/or direction of the BIOS. For example, activation of a hardware licensed component may involve direct activation by the BIOS, while activation of a software component may involve a logical trigger, such as a flag or other variable in BIOS NV-RAM, that is accessed by the software component upon installation and/or launch. When the licensed component has been determined, the BIOS may query the license information and/or the license policy to determine which actions to take to activate the license.

Referring now to FIG. 3, a block diagram of selected elements of an embodiment of method 300 for license management using a BIOS is depicted in flowchart form. Method 300 may be performed using information handling system 100 (see FIG. 1). It is noted that certain operations described in method 300 may be optional or may be rearranged in different embodiments. As shown, method 300 may represent operations that are included in operation 206 (see FIG. 2).

Method 300 may begin with a decision whether the license information indicates (operation 302) a license duration for the license. When the result of operation 302 is NO, method 300 may end (operation 304), which may signify that a license expiration is not used. When the result of operation 302 is YES, based on the activation timestamp and the license duration, an expiration timestamp may be calculated (operation 306) for the license. The expiration timestamp may be calculated using an applicable time source, such as the local system clock or a remote time server, as described above with respect to the activation timestamp (see FIG. 2). Then, an expiration callback event may be registered (operation 308) for execution when the expiration timestamp occurs. In certain embodiments, the expiration callback event may be a software routine, such as included in BIOS firmware 192. In other embodiments, the expiration callback event may be associated with a hardware trap. Then, a clock callback event may be registered (operation 310) for execution when a change in a system clock of the information handling system is initiated. For example, the BIOS may install a trap for a real-time clock (system clock) included in the information handling system at a particular port address (e.g., 0x70). When the particular port address is accessed, signifying an attempted change to the system clock value, the BIOS may interrupt the function call and execute a process (see also method 500 in FIG. 5), and may further be able to capture both the old and the new values for the system clock.

Figure 4:
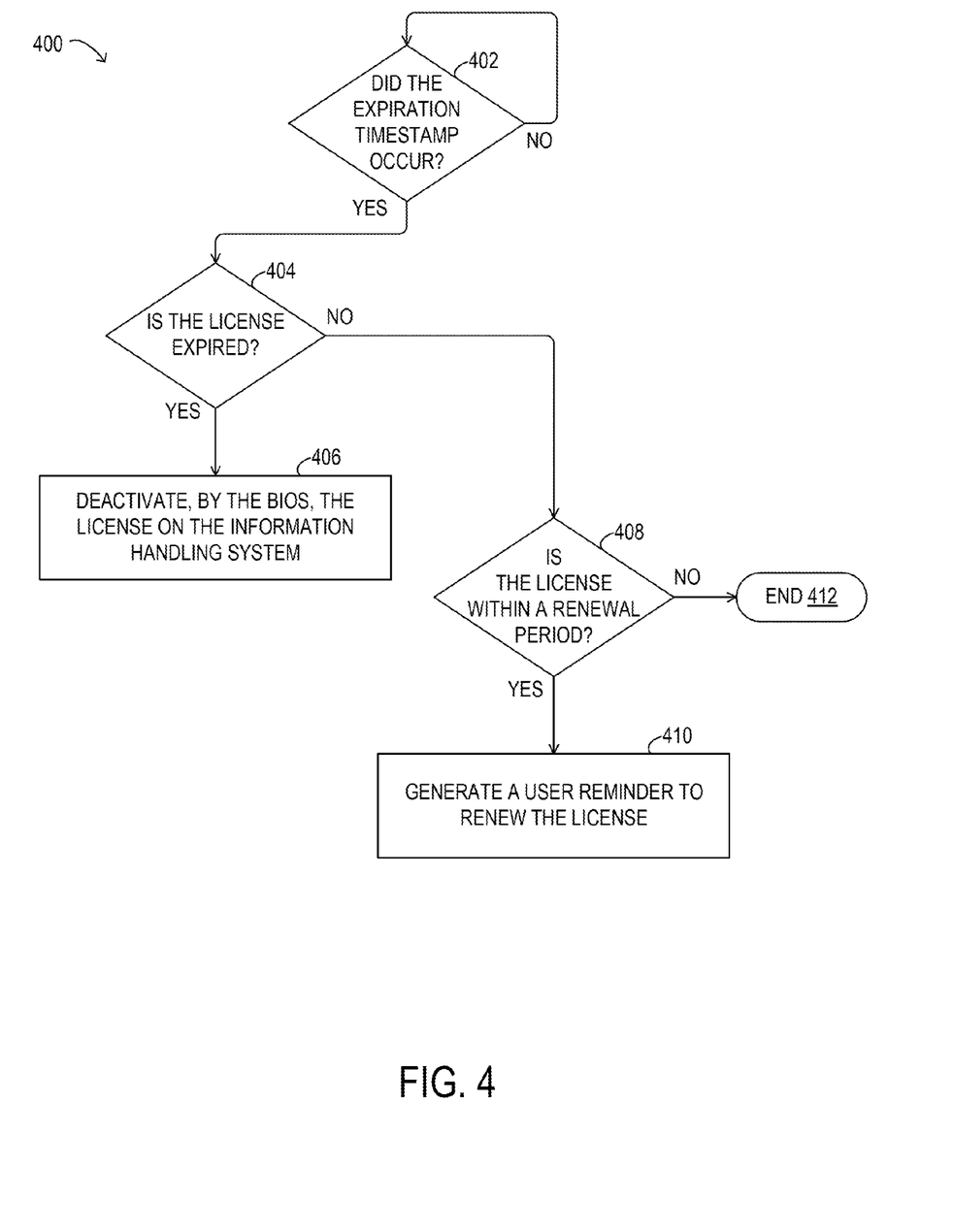
FIG. 4 is a flowchart depicting selected elements of an embodiment of a method for license management using a BIOS.

Referring now to FIG. 4, a block diagram of selected elements of an embodiment of method 400 for license management using a BIOS is depicted in flowchart form. Method 400 may be performed using information handling system 100 (see FIG. 1). It is noted that certain operations described in method 400 may be optional or may be rearranged in different embodiments. Method 400 may represent operations of a license expiration process for the license, for example, subsequent to operation 310 (see FIG. 3). It is noted that method 400 may represent actions associated with the expiration callback event described above with respect to operation 308.

Method 400 may begin with a decision whether the expiration timestamp occurred (operation 402). When the result of operation 402 is NO, method 400 may loop back to operation 402. In certain embodiments, the loopback to operation 402 may represent a polling operation to check whether a current timestamp matches the expiration timestamp and may accordingly be associated with a fixed or variable polling period. In other embodiments, the loopback in operation 402 may represent a hardware trap, as described above. When the result of operation 402 is YES, a further decision may be made whether the license is expired (operation 404). Operation 404 may involve querying the license information to reconcile potential inconsistencies with the expiration timestamp. When the result of operation 404 is YES, the license may be deactivated (operation 406) by the BIOS on the information handling system. It is noted that in some embodiments, operation 406 may be omitted, for example, when the license policy indicates that no deactivation is applicable. Operation 406 may include further steps to deactivate the licensed component associated with the license, such as disabling a hardware component, for example. Additionally, operation 406 may involve accessing the license policy for the license to determine appropriate actions to take upon deactivating the license, such as, but not limited to, storing license parameters, sending notifications, etc. When the result of operation 404 is NO, a further decision may be made whether the license is within a renewal period. When the result operation 408 is NO, method 400 may end (operation 412). When the result of operation 408 is YES, a user reminder to renew the license may be generated (operation 410). The user reminder may include an option to purchase a renewal of the license.

Figure 5:
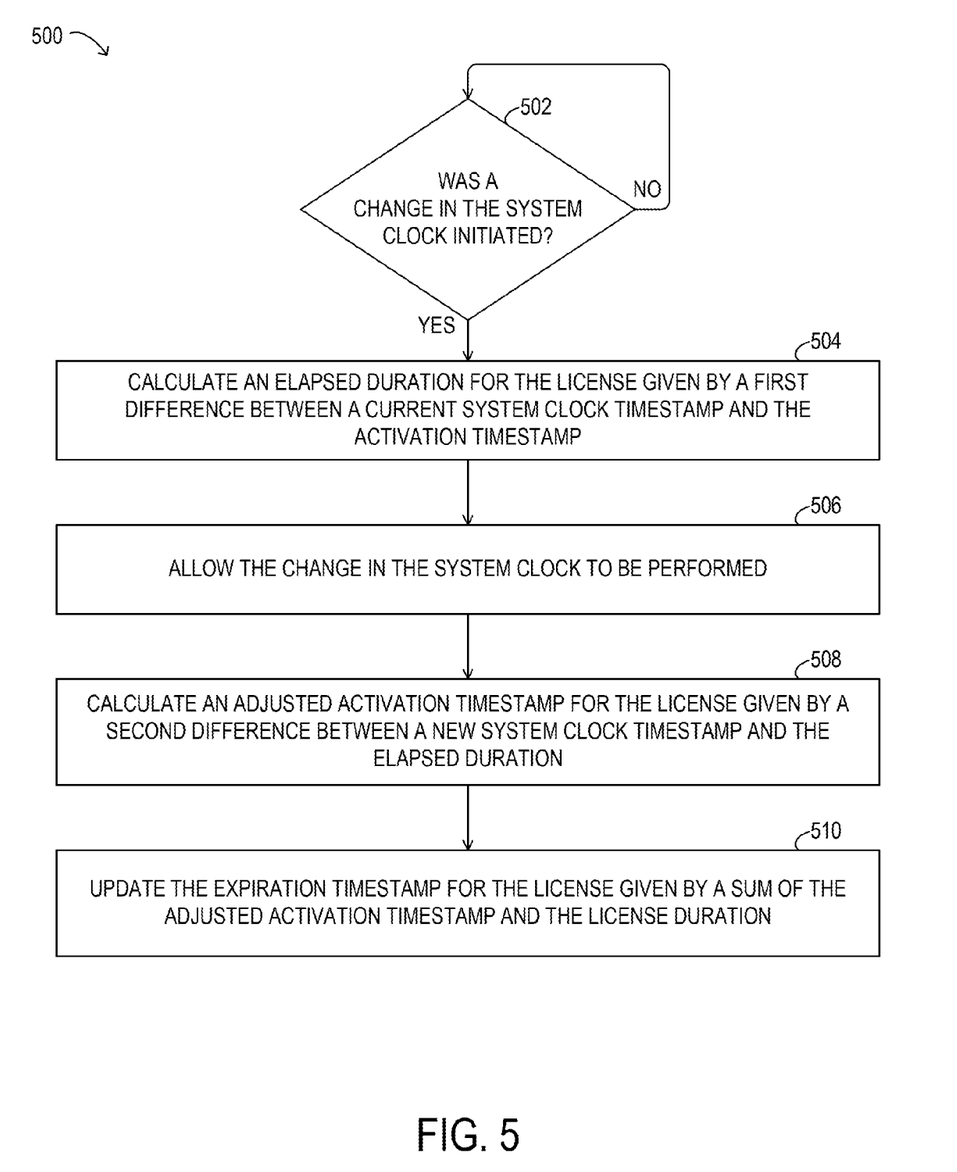
FIG. 5 is a flowchart depicting selected elements of an embodiment of a method for license management using a BIOS.

Referring now to FIG. 5, a block diagram of selected elements of an embodiment of method 500 for license management using a BIOS is depicted in flowchart form. Method 500 may be performed using information handling system 100 (see FIG. 1). It is noted that certain operations described in method 500 may be optional or may be rearranged in different embodiments. Method 500 may represent operations of a clock callback event, for example, as described above with respect to operation 310 (see FIG. 3).

Method 500 may begin with a decision whether a change in the system clock was initiated (operation 502). When the result of operation 502 is NO, method 500 may loop back to operation 502. In certain embodiments, the loopback in operation 502 may represent a hardware trap, as described above, that enables method 500 to respond in real-time and perform operations prior to the clock change. When the result of operation 502 is YES, an elapsed duration for the license given by a first difference between a current system clock timestamp and the activation timestamp may be calculated (operation 504). The change in the system clock may be allowed (operation 506) to be performed. An adjusted activation timestamp for the license, given by a second difference between a new system clock timestamp and the elapsed duration, may be calculated (operation 508). The expiration timestamp for the license, given by a sum of the adjusted activation timestamp and the license duration, may be updated (operation 510).

Methods and systems for license management using a basic input/output system (BIOS) may involve performing license activation, monitoring, and enforcement. The BIOS may store license information to manage licenses for hardware and/or software components of an information handling system. License management by the BIOS may include monitoring a system clock of the information handling system for changes to avoid tampering with license durations.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   receiving, at a basic input/output system (BIOS) included in an information handling system, a request to activate a license associated with the information handling system;
   retrieving, by the BIOS from a BIOS non-volatile memory, license information for the license, wherein the license information is usable to activate the license;
   based on the license information, activating the license on the information handling system, wherein the BIOS stores an activation timestamp for the license in the BIOS non-volatile memory;
   when the license information indicates a license duration for the license, further comprising:
      based on the activation timestamp and the license duration, calculating an expiration timestamp for the license;
      registering an expiration callback event for execution when the expiration timestamp occurs; and
      registering a clock callback event for execution when a change in a system clock of the information handling system is initiated; and
   when the change in the system clock of the information handling system is initiated, executing the clock callback event, further comprising:
      before the change in the system clock is performed, calculating an elapsed duration for the license, wherein the elapsed duration is given by a first difference between a current system clock timestamp and the activation timestamp;

allowing the change in the system clock to be performed;

after the change in the system clock is performed, calculating an adjusted activation timestamp for the license, wherein the adjusted activation timestamp for the license is given by a second difference between a new system clock timestamp and the elapsed duration;

updating the expiration timestamp for the license, wherein the expiration timestamp is given by a sum of the adjusted activation timestamp and the license duration; and storing the adjusted activation timestamp and the updated expiration timestamp to the BIOS non-volatile memory.

2. The method of claim 1, wherein activating the license includes:

enabling, by the BIOS, a licensed component associated with the information handling system for use according to the license, wherein the licensed component is selected from: a hardware component and a software component.

3. The method of claim 1, wherein the activation timestamp is based on one of:

a local timestamp from a system clock of the information handling system; and a remote timestamp obtained from a timestamp server via a network connection.

4. The method of claim 1, further comprising:

when the expiration timestamp occurs, executing the expiration callback event, including:

when the license is within a renewal period prior to expiration of the license, generating a user reminder to renew the license; and when the license is expired, deactivating, by the BIOS, the license on the information handling system.

5. The method of claim 4, wherein deactivating the license includes:

disabling, by the BIOS, a licensed component associated with the information handling system for use according to the license, wherein the licensed component is selected from: a hardware component and a software component.

6. An information handling system, comprising:

a processor subsystem having access to a basic input/output system (BIOS), wherein the BIOS includes instructions executable by the processor subsystem to:

receive a request to activate a license associated with the information handling system;

retrieve, from a BIOS non-volatile memory, license information for the license, wherein the license information is usable to activate the license;

based on the license information, activate the license on the information handling system, wherein an activation timestamp for the license is stored in the BIOS non-volatile memory;

when the license information indicates a license duration for the license, wherein the BIOS further comprises instructions to:

based on the activation timestamp and the license duration, calculate an expiration timestamp for the license;

register an expiration callback event for execution when the expiration timestamp occurs; and register a clock callback event for execution when a change in a system clock of the information handling system is initiated; and when the change in the system clock of the information handling system is initiated, execute the clock callback event, further comprising instructions to:

before the change in the system clock is performed, calculate an elapsed duration for the license, wherein the elapsed duration is given by a first difference between a current system clock timestamp and the activation timestamp;

allow the change in the system clock to be performed;

after the change in the system clock is performed, calculate an adjusted activation timestamp for the license, wherein the adjusted activation timestamp for the license is given by a second difference between a new system clock timestamp and the elapsed duration;

update the expiration timestamp for the license, wherein the expiration timestamp is given by a sum of the adjusted activation timestamp and the license duration; and store the adjusted activation timestamp and the updated expiration timestamp to the BIOS non-volatile memory.

7. The information handling system of claim 6, wherein the instructions to activate the license include instructions to:

enabling a licensed component associated with the information handling system for use according to the license, wherein the licensed component is selected from: a hardware component and a software component.

8. The information handling system of claim 6, wherein the activation timestamp is based on one of:

a local timestamp from a system clock of the information handling system; and a remote timestamp obtained from a timestamp server via a network connection.

9. The information handling system of claim 6, wherein the BIOS further comprises instructions to:

when the expiration timestamp occurs, execute the expiration callback event, including:

when the license is within a renewal period prior to expiration of the license, generate a user reminder to renew the license; and when the license is expired, deactivate the license on the information handling system.

10. The information handling system of claim 9, wherein the instructions to deactivate the license include instructions to:

disable a licensed component associated with the information handling system for use according to the license, wherein the licensed component is selected from: a hardware component and a software component.

11. An article of manufacture comprising a non-transitory computer-readable medium storing instructions, the instructions representing a basic input/output system (BIOS), that, when executed by a processor of an information handling system, cause the processor to:

receive a request to activate a license associated with the information handling system;

retrieve, from a BIOS non-volatile memory, license information for the license, wherein the license information is usable to activate the license; and based on the license information, activate the license on the information handling system, wherein an activation timestamp for the license is stored in the BIOS non-volatile memory;
when the license information indicates a license duration for the license, further comprising instructions to:
based on the activation timestamp and the license duration, calculate an expiration timestamp for the license;
register an expiration callback event for execution when the expiration timestamp occurs; and
register a clock callback event for execution when a change in a system clock of the information handling system is initiated; and
when the change in the system clock of the information handling system is initiated, execute the clock callback event, including instructions to:
before the change in the system clock is performed, calculate an elapsed duration for the license, wherein the elapsed duration is given by a first difference between a current system clock timestamp and the activation timestamp;
allow the change in the system clock to be performed;
after the change in the system clock is performed, calculate an adjusted activation timestamp for the license, wherein the adjusted activation timestamp for the license is given by a second difference between a new system clock timestamp and the elapsed duration;
update the expiration timestamp for the license, wherein the expiration timestamp is given by a sum of the adjusted activation timestamp and the license duration; and
store the adjusted activation timestamp and the updated expiration timestamp to the BIOS non-volatile memory.

12. The article of manufacture of claim 11, wherein the instructions to activate the license include instructions to:
enabling a licensed component associated with the information handling system for use according to the license, wherein the licensed component is selected from: a hardware component and a software component.

13. The article of manufacture of claim 11, wherein the activation timestamp is based on one of:
a local timestamp from a system clock of the information handling system; and
a remote timestamp obtained from a timestamp server via a network connection.

14. The article of manufacture of claim 11, further comprising instructions to:
when the expiration timestamp occurs, execute the expiration callback event, including:
when the license is within a renewal period prior to expiration of the license, generate a user reminder to renew the license; and
when the license is expired, deactivate the license on the information handling system.

15. The article of manufacture of claim 14, wherein the instructions to deactivate the license include instructions to:
disable a licensed component associated with the information handling system for use according to the license, wherein the licensed component is selected from: a hardware component and a software component.

* * * * *